United States Patent [19]

Rétfalvy et al.

[11] Patent Number: 4,742,222
[45] Date of Patent: May 3, 1988

[54] SELECTIVE OPTICAL DETECTOR APPARATUS UTILIZING LONGITUDINAL CHROMATIC ABERRATION

[75] Inventors: György Rétfalvy; Péter Sugár; Zoltán Zorkóczy, all of Budapest, Hungary

[73] Assignee: Tavkozlesi Kutato Intezet, Hungary

[21] Appl. No.: 852,631

[22] PCT Filed: Jul. 23, 1985

[86] PCT No.: PCT/HU85/00047
§ 371 Date: Mar. 19, 1986
§ 102(e) Date: Mar. 19, 1986

[87] PCT Pub. No.: WO86/01005
PCT Pub. Date: Feb. 13, 1986

[30] Foreign Application Priority Data

Jul. 23, 1984 [HU] Hungary ............................. 2842/84
Jul. 22, 1985 [YU] Yugoslavia ............................. 1200

[51] Int. Cl.⁴ .............................................. G01J 3/50
[52] U.S. Cl. ...................................... 250/226; 356/332
[58] Field of Search ............... 356/331, 332; 250/226; 350/431, 445

[56] References Cited

U.S. PATENT DOCUMENTS 3,185,021  5/1965  Thompson ........................... 340/431
3,563,659  2/1968  Thompson ........................... 356/331
4,585,349  4/1986  Gross et al. ........................... 356/375

Primary Examiner—David C. Nelms
Assistant Examiner—Jessica L. Ruoff
Attorney, Agent, or Firm—Handal & Morofsky

[57] ABSTRACT

The invention relates to a selective detector arrangement for the detecting of approximately point-like collected light in a predetermined wavelength region and angle of the field of vision, with an optical collector system which is made from a material passing the light at a predetermined wavelength range and with a light sensitive sensor element. The essence of the invention resides in that within a predetermined wavelength range for the optical collector system there is a characteristic focal point surface, which is spaced from the focal point surfaces characteristic of wavelengths lying outside of such range and that the sensor element is coupled with the optical collector system in optical fashion over an aperture which is formed in the focal point surface associated with the predetermined wavelength range, and wherein the size of the aperture substantially corresponds in size to the size of the focal point surface of the light falling at the predetermined angle of the field of vision and in the predetermined wavelength range.

6 Claims, 2 Drawing Sheets

SELECTIVE OPTICAL DETECTOR APPARATUS UTILIZING LONGITUDINAL CHROMATIC ABERRATION

FIELD AND BACKGROUND OF THE INVENTION

The invention relates to a selective optical detector apparatus which is adapted for the reception of optical signals, when the spatially extending light bundle is parallel or can be formed into parallel and, when it is also substantially monochromatic. The detector should receive only the light which falls on a narrow wavelength range, and it should be insensitive to light which lies outside of such a range.

Worldwide considerable research efforts have been made in order to widen the operating frequency of locators, communication transmission devices and similar special measuring arrangements, into the optical region.

In the case of opto-electrical devices and measuring arrangements which are intended for the reception of spatially extending (cosmic, atmospheric and underwater signals) direct or reflected signals of slight intensity, the sensitivity of the receiver will become considerably reduced by the background light and interference light which fall onto the sensor surface. The background light and the interference light which fall within the operating angle of the receiver will result in a greatly reduced use of the electronic circuit elements within the receiver by reducing the otherwise available possibilities of sensitivity.

For this reason in the above-mentioned devices frequently the operating difficulties affecting the operating capacities during day and night, are separately listed. The function of a receiver of such opto-electronic devices resides conventionally in the reception of optical signals having a narrow spectrum. The sensing element usually is a photon multiplier or some type of light sensitive semiconductor device, which is adapted for the reception of a relatively wide spectrum and does not possess its own selectivity. In the hitherto known opto-electrical devices the influence of the background light and of the interference light has been attempted to be reduced by a narrowing of the operating angle (the angle of the field of vision) of the receiver and by employing a selective or color filter.

Such a solution has the following disadvantages: the effective angle of the receiver is now limited considerably on one hand due to the technical-technological limitation (stability of the aiming or sighting and of the fixation), and on the other hand, due to the nonuniform character of the transmission medium, the wandering of the light bundle in opto-electronic devices, the selection of the spectrum to be received, and the reduction of the background lights and of the interference lights will necessarily be performed by the use of filters. A relatively good selection can be accomplished by means of an interference filter having a small BW, the spectrum range of which has a value of 5–20 mm. Such interference filters are used in the receiver of many well-known opto-electronic devices. Their common disadvantages resides in that their use will lead to an additional damping. For such an application a number of examples can be found in the corresponding technical literature.

In the publication by B. G. King, P. J. Fitzgerald, and H. A. Steint entitled "An experimental study of atmospheric optical transmission" (The Bell System Technical Journal Vol. 62, No. 3. 1983) a narrow band filter is used in an optical receiver constructed as a communication experiment which will lead to a loss of 3 dB.

In addition to the filters a score of other solutions are used to reduce the influences of the background light and of the interference light, and for example, shielding cassettes are built for the optics and the operating angle of the receiver is limited. In the optical receiver according to M. J. Green entitled "Application of an Optical Data Link in an Airborne Scanning System" (Review of Scientific Instruments, Vol. 53, No. 8, 1982, pages 1278–1280), an infrared filter is used for filtering out the visible light, which, however, will not lead to any special result.

In the optical system according to G. Michael Lauham entitled "Air Force Lasercom Space Measurement Unit" (CH 1939-6/80, 1980, IEEE 27.2.1.–27.2.3) the receiver is provided with a narrow band filter (interference filter).

Thomas F. Wiener discloses in an article entitled "Strategic Laser Communications" (CH 1539-6/80 IEEE 27.4.1.–27.4.5) that the basic problem of outdoor receivers resides in the application of a corresponding filter and proposes as a solution the construction of a highly complicated crystal physical filter. The scheme of such a filter is described in the article entitled "EOTF Independently Controls Wavelength and Linewidth", which appeared in the September issue of the Electronic Design, 1979.

The use of interference filters and of resonance-narrow band filters which rest on a similar functional principle, will, however, run into a number of problems, of which the most significant ones are the following:

The interference filters are manufactured with a complicated technology during which extremely strict requirements with respect to the accuracy must be met, and, as a result, they are extremely expensive and their manufacturing in a mass production becomes very complicated;

From the selectivity viewpoint the interference filters offer a relative usefulness, however, they still create a considerable loss, which comes about by the strong damping of the useful signal, that is, in fixed construction into the device and in the absence of a background or interference light, the selectivity becomes superfluous but the sensitivity of the receiver will still be reduced (that is its operating range), since in this case without a filter the signal/noise ratio would not create any limitation on the sensitivity.

Building an interference filter into the receiver will complicate the optical system, since they exert their filtering affect mainly in the axial direction, onto the light bundle which is parallel with the optical axis of the system, a light bundle which will fall at a different angle with respect to the axis will create resonances on different wavelengths. A correction of an error can be had only by the addition of other optical elements, which will increase the number of the optical elements present. The associated increase in the number of the optical boundary surfaces will lead to a further loss, that is, to an increase of the damping;

The interference filters are manufatured for a fixed wavelength, they cannot be tuned, therefore the receiver cannot be set to a wavelength of the light which one could consider receiving. The wave pass BW therefore is defined by the results of the technology involved and, after the construction of the filter into the optical system, cannot be changed anymore. While the light source used as the transmitter will radiate wavelengths which scatter and, in the case of fast moving objects, such as cosmic objects, it will also become shifted.

Due to such limited possibilities of interference filters, other solutions were looked for, and for example, a filter has been developed by using dual-refracting crystals, which can be tuned with the help of acoustic waves and with an electrical field, which, however, turned out to be more complicated than the interference filters and its application has also led to a substantial amount of additional damping.

Due to the above-noted problems in simple structures of opto-electronic outdoor devices no interference filters or other optical filters were used which would have a high selectivity. Instead simple colored filters have been put in which were made from a material which has a substantially small selectivity and, which due to the absence of a high selectivity, cannot have a substantial increase in the ratio signal-noise and, at the same time they weaken the useful signal. Their most important advantage resides in that they offer to a certain extent a protection for the detector element against the thermal influences of the intensive background lights and interference lights. In a communication transmission device according to Sandor Takacs (Technical University, Budapest) entitled "Wideband communication transmission experiments in the optical range" (Hiradas-Technika, 1980, page 350) no protective means have been used for excluding the surrounding light. Also the receiver according to Swiss Pat. No. 625,923 does not offer a solution for the protection against the interfering influence of the background light.

SUMMARY OF THE INVENTION

The object of the invention resides in the provision of a selective optical detector arrangement, which can be used especially in the optical communication transmission devices and locators, and which will not further or not more than to a small extent dampen the light arriving in certain pass waveband region, beyond the damping of the optical collector system;

enables the selection and receiving of a useful signal having an intensity much smaller by several orders of magnitude than compared with the magnitude of the background and of the interference light, and in a given case;

enables the tuning of the detector device to a desired wavelength;

enables the setting of a desired bW;

enables the setting of the directional characteristics of reception.

The above object according to the present invention has been accomplished by a selective optical detector arrangement, which is especially adapted for the detection of a light bundle having a small spectrum width or of a monochromatic light for optical communication transmission systems or locators, and which can be used for the detection of a point-like collection of light in a given wavelength range and field of vision angle. The detector arrangement comprises a collection system, consisting of a material transmitting light in a predetermined wavelength range, and a sensor element. According to the invention, the focal points associated with the predetermined wavelength region are located on a focal point surface which lies in a position distant from the wavelengths lying outside of the predetermined wavelength region. The sensor element is coupled with the collector system in an optical fashion by means of an aperture lying in the focal point surface associated with the predetermined wavelength region. The magnitude of the aperture substantially corresponds to the magnitude of the focal point surface, which is associated with the light lying in the predetermined wavelength region and falling in under the predetermined angle of the field of vision.

It is advantageous when the sensor element is provided with a light-sensitive surface and together with the optical system is placed in an optically closed housing having a very slight reflection, and wherein the light sensitive surface of the housing is placed behind a closure surface and in the path of the light passing through the aperture of the closure surface. The focal distance can be adjusted as a function of the wavelength on the boundaries of the region of the light wavelengths under detection. Between the optical collector system and the light sensitive surface of the sensor element there is provided a closing surface having an aperture. The size of the aperture substantially corresponds, or is larger than the focal point surface associated with the light wavelength to be detected and which aperture formed in the closing surface is arranged in the focal point associated with the light to be detected.

It is advantageous to construct the size of the aperture in an adjustable fashion. It is preferred when the shape of the aperture is variable. Such measures result in the adjustability of the operating angle of the device.

In order to achieve a relatively easy processing of the detected optical signal, it is preferred that the sensor element is constructed as an opto-electrical transducer.

In order to avoid an overloading, especially of a thermal nature, it is preferred to use additional color filters. Further preferred embodiments are illustrated in the dependent claims.

The light in given situations can also be diverted or shaped by means of further optical devices, such as light conductors, for example, by fiber optics. It is preferred when the aperture is movable together with the sensor element or in the case of a correspondingly larger sensor surface, without the sensor element, as a function of the path of the image point associated with the wavelength, thereby the system is constructed in a tunable fashion. In the event of light coming from several directions, in the individual directions an aperture can be arranged in each such direction.

It is noted here that the word aperture should convey the meaning of a surface, over which the light can reach the sensor element. Therefore the aperture can, for example, be the input surface of an optical conductor, while the closing surface, for example, can be a portion of the optical conductor, which does not receive the light itself. At a correspondingly larger size and form of the sensor element, the aperture will represent the active surface of this sensor element, while the inactive surface of the sensor element will function as the closing surface.

It can be furthermore advantageous, when the shape of the aperture F can be formed in a variable fashion, so that according to the form of the aperture a light coming from different directions can be formed with various BW characteristics.

Such construction is especially advantageous when a scattering of the transmission path or the mechanical oscillations of the receiver have a preferred direction.

For the coupling or decoupling of an auxiliary signal one will have to use an additional mirror. Such a solution, used with the same optical collector system A, for example, one may realize the directing and/or a coupling in two directions.

It may be advantageous, when between the optical collector system and the closing surface having the aperture therein, an additional cover element G is arranged, which will thereby prevent that light beams falling in the axial direction and not undergoing a refraction could not pass through the aperture without a filtering effect. As a result of such measure, the side steepness of the beam curve of detection for that sensor element will increase. Such a cover element can be also arranged before the optical collector system.

BRIEF DESCRIPTION OF THE DRAWING

In the following, the selective optical detector arrangement according to the invention will be described in more detail with respect to preferred embodiments with reference to the attached drawings, in which.

DESCRIPTION OF THE PREFERRED EMBODIMENTS

Figure 1:
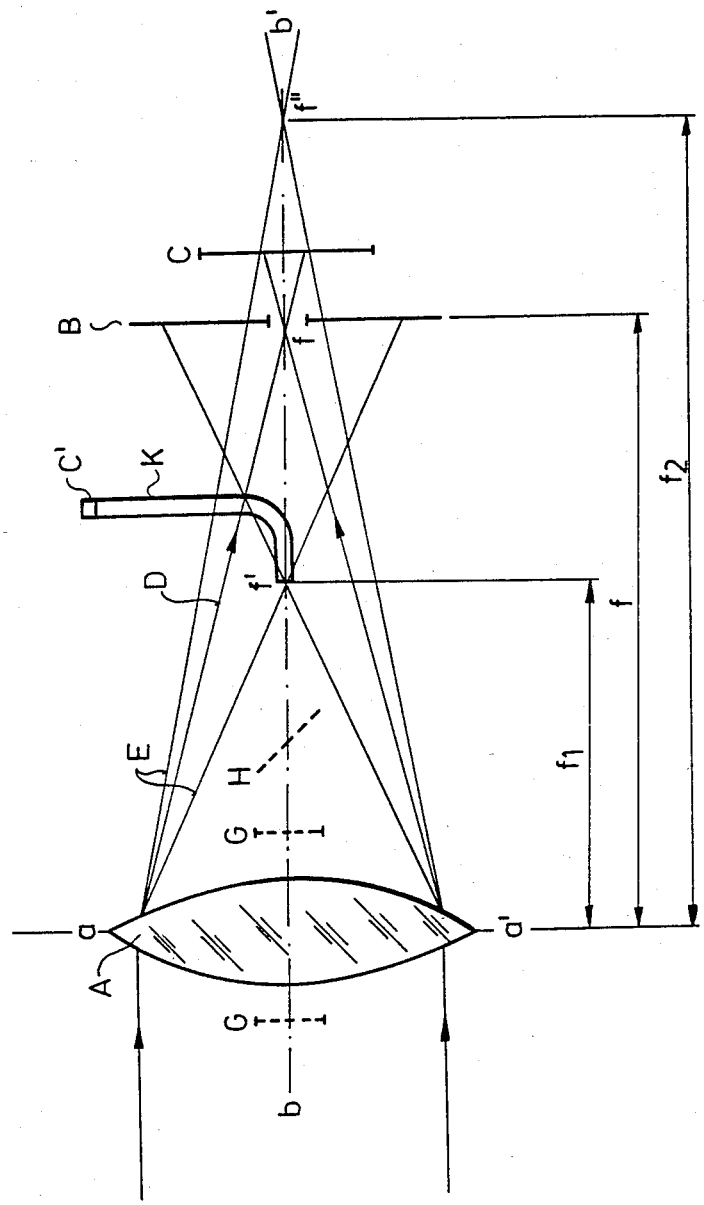
FIG. 1 is an advantageous embodiment of the selective optical detector arrangement according to the invention.

In the embodiment of the invention illustrated in FIG. 1, the following reference characters are used in addition; $f_1$, $f_2$, f for the focal distance, a–a' represents the main plane of the optical collector system A. The optical collector system A has for the different wavelengths different focal points, f', f, f'', and, at the same time, due to the spherical shape distortion of the optical collector system A and to other distortions, the mass of the focal point surface obtained on the detected wavelength is smaller than the aperture of the closing surface B, otherwise the filtering effect can be accomplished only by additional damping. Depending on the intensity distribution of the focal point surface, the selectivity can be increased only by a simultaneous additional damping. The aperture F located on the closing surface B has an imaging point corresponding to the wavelength of the light to be detected. In the light path of the light detected there is a sensor element C arranged behind the closing surface B. The light passing through the aperture F can in a given situation be diverted or shaped by means of further optical devices, such as light conductors, for example, fiber optics. It is advantageous when the aperture F is movably constructed together with the sensor element C or, in the case of a correspondingly larger sensor surface, without the sensor element C, along the path of the imaging point which corresponds always to a function of the wavelength, in order that the system could be tuned. The light coming from various directions can be assigned each an individual aperture F.

The optical collector system A, illustrated in FIG. 1, has been realized in practice generally through a lens system. The optical collector system A is preferably an optic designed for large color deviations and with small distortion, and in which in the focal plane associated with the wavelength to be detected there is arranged a closing surface B having an aperture F, and behind the closing surface B there is a sensor element C arranged. The sensor element C comprises a known opto-electric transducer, such as a PIN diode. Through the aperture F of the closing surface B arranged in the focal plane of the light to be detected having a predetermined wavelength, the light beam with a selected wavelength will pass without damping and will fall onto the light sensitive surface of the sensor element C. This process is illustrated in FIG. 1 by the beam path of the received wavelength D. The other wavelengths have associated therewith a different focal point f, that is, the focal points f, f', f'' become shifted in dependence from the wavelength on the optical axis b—b', whereby the light having a differing wavelength, in the plane of the closing surface B, will result in a larger light surface on the aperture located in the closing surface B. This process is illustrated in FIG. 1 by the beam path of the wavelength E which has not been received. The damping characteristic of the sensor element C according to the invention can be calculated as a function of the wavelength employing the relationship of the magnitude of the aperture F and of the magnitude of the light image produced in the plane of the aperture F.

As a possible solution FIG. 1 illustrates a sensor element C' formed with a fiber optics K. Such sensor element C' is independent from the sensor element C and is sensitive to a light having a focal point f' associated with its wavelength.

Figure 2:
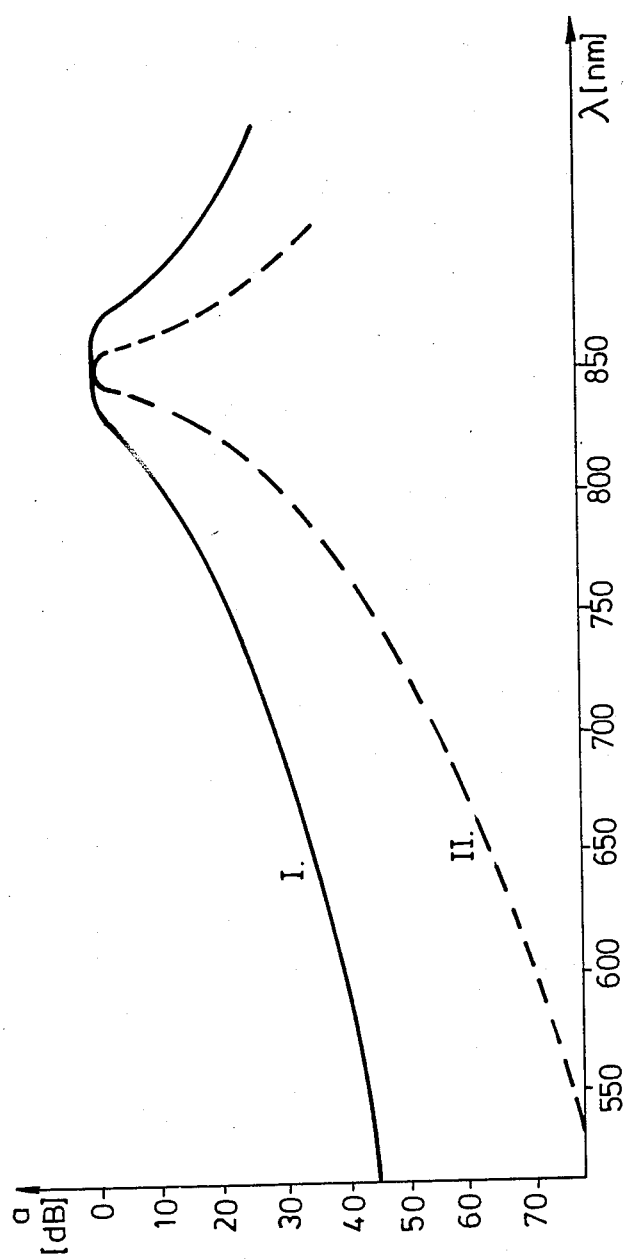
FIG. 2 is a damping-wavelength-characteristic for the embodiment of the invention illustrated in FIG. 1.

FIG. 2 illustrates in an exemplary fashion the damping characteristics of the tested optical collector system A. The employed optical collector system A comprises a triple lense construction which has been carefully corrected for spherical shape distortions. As a result of the appropriate correction, the magnitude of the focal point surface resulting from the spherical shape distortion is 20 $\mu$m. The lenses were manufactured from a heavy flint glass of the type SF6, which possesses the ability for a considerable color scattering. The employed optical collector system A has a focal distance of about 80 mm and a light intensity of 1. In the vicinity of the wavelength of 820 nm, the steepness of the function focal distance-wavelength is 9.4 $\mu$m/nm. The diameter of the aperture F formed in the closing surface B amounts to 300 $\mu$m for the curve I and to 50 $\mu$m for the curve II. It follows from the values of the illustrated example that be employing the solution of the present invention with physically realizable elements, one will be able to attain an adjustable selectivity on a wide range without introducing an additional damping into the system.

The optical detector arrangement according to the invention has been built into the receiver of an optical communication transmission system for digital transmission. The receiving apparatus has been constructed to receive optical signals having a wavelength of about 820 nm. As an approximate monochromatic light source the transmitter employed a semiconductor laser. As a sensor element an avalanche photodiode has been used. The effective surface of the sensor element C was 0.2 mm$^2$. As a combined effect due to the elimination of the reflection and scattering by the arrangement of the sensor element C, as well as the elimination of the color deviation and, due to the small dimension of the aperture F, in the opto-electronic communication transmission apparatus having a sensor element C according to the invention therein, during a wavelength depending transmission the operating range during the day could be increased from 2-3 km to 10-15 km without changing the other parameters. The operating range during the night (during operation without a background or backgroundlight) stayed unchanged, that is, remained at its original value of 10-15 km.

Similar results have been obtained also when the inventive solution has been used under active or passive optical-electronic apparatus (laser distance measuring devices, laser locators, passive infra locators, active infra telescopes) which operate with primary or secondary signals having a small BW.

Considering the particular application, the apparatus according to the invention can be advantageously combined with other types of color filters. Among others, it is especially advantageous to use filters of which the material of which is colored, especially for the thermal protection of the optical closing surface.

In summing up, one may conclude that the selective optical detector arrangement according to the invention possesses a number of advantages, which can be as follows:

the use of interference filters and complicated crystalphysical filters becomes obviated by the invention;

the use of the solution according to the invention will result in a clear advantage, namely, an additional damping will not occur;

the manufacturing is simple and can be had at low cost and requires no special technology;

the apparatus according to the invention can be tuned to the wavelength to be detected;

the BW which is to be detected is adjustable;

the directional characteristics of the optical-electronic apparatus are changeable;

the operating range, sensitivity of the optical-electronic outdoor apparatus can be considerably increased by using the solution of the present invention.

We claim:

1. A selective optical detector for detecting light in a predetermined wavelength range and received in a predetermined field of acceptance comprising:

a low reflection housing including an optical collector system exhibiting an essential chromatic aberration;

a sensor element sensitive for light rays of said wavelength range for translating light into electrical signals;

an aperture coupling said sensor element optically with said collector system and having a size and location substantially corresponding to the focal point surface of said light of said wavelength range and received in said field of acceptance;

a closing surface provided with said aperture and located between said collector system and said sensor;

means for directing said optical collector system to convey a narrow BW or monochromatic light emitted by an optical communication apparatus or reflected by a body illuminated by an optical locator via said aperture onto said sensor element;

and a means to move said aperture to said location of said focal point surface in dependence of said wavelength to be detected.

2. The selective optical detector as claimed in claim 1, wherein said aperture is of adjustable size to adjust the BW of said wavelength range in combination with said field of acceptance.

3. The selective optical detector as claimed in claim 1, wherein said aperture is of adjustable shape to adjust said field of acceptance to have a preferred direction.

4. The selective optical detector as claimed in claim 1, further comprising a mirror for coupling or decoupling a part of light passing through said collector system.

5. The selective optical detector as claimed in claim 1, further comprising a cover element preventing an axial portion of received light to reach said sensor element having an active surface substantially coinciding with said aperture.

6. The selective optical detector as claimed in claim 1, further comprising a color filter for filtering light entering said housing.

* * * * *